United States Patent
Bettua et al.

(10) Patent No.: US 12,143,885 B2
(45) Date of Patent: Nov. 12, 2024

(54) SYSTEM AND METHOD FOR SECURING A FACILITY

(71) Applicant: Volan Technology, Inc., Hoboken, NJ (US)

(72) Inventors: Michael Bettua, Hoboken, NJ (US); Alexander M. Adelson, Andes, NY (US); Ka Kui Cheng, Kowloon (HK); Timothy Chinowsky, Seattle, WA (US); Chi Ming Tse, Markham (CA)

(73) Assignee: Volan Technology, Inc., Hoboken, NJ (US)

( * ) Notice: Subject to any disclaimer, the term of this patent is extended or adjusted under 35 U.S.C. 154(b) by 440 days.

(21) Appl. No.: 17/597,207

(22) PCT Filed: Jul. 15, 2020

(86) PCT No.: PCT/US2020/042046
§ 371 (c)(1),
(2) Date: Dec. 29, 2021

(87) PCT Pub. No.: WO2021/011599
PCT Pub. Date: Jan. 21, 2021

(65) Prior Publication Data
US 2022/0248169 A1  Aug. 4, 2022

Related U.S. Application Data

(60) Provisional application No. 62/874,113, filed on Jul. 15, 2019.

(51) Int. Cl.
*H04W 4/02* (2018.01)
*G01S 5/02* (2010.01)
(Continued)

(52) U.S. Cl.
CPC .............. *H04W 4/021* (2013.01); *G07C 9/28* (2020.01); *G08B 25/10* (2013.01); *G08B 25/12* (2013.01); *H04W 84/18* (2013.01)

(58) Field of Classification Search
CPC ........ H04W 4/021; H04W 84/18; G07C 9/28; G08B 25/10; G08B 25/12
See application file for complete search history.

(56) References Cited

U.S. PATENT DOCUMENTS

| 3,694,579 A | 9/1972 | McMurray |
| 6,822,568 B2 | 11/2004 | Gehlot et al. |

(Continued)

FOREIGN PATENT DOCUMENTS

| CA | 2308577 | 5/1999 |
| CN | 104299378 A | 1/2015 |

(Continued)

OTHER PUBLICATIONS

Supplementary European Search Report for EP Application No. 20839649.9 mailed Jul. 13, 2023, 8 pages.

(Continued)

*Primary Examiner* — Moustapha Diaby
(74) *Attorney, Agent, or Firm* — DLA Piper LLP US

(57) ABSTRACT

A directional position system for use in facilities having rooms, hallways, and other areas can include a plurality of portable units carried or worn by selected users in the facility; a plurality of stationary units mounted in each of a number of locations within the facility; and an administrative unit. At least one of the portable units can include at least one button for sending a signal, when pressed, for a type of emergency. At least one of the stationary units can include a display for indicating a direction to move during an emergency. The administrative unit can be configured to be monitored by security personnel and can be configured to (Continued)

receive any signal transmitted from any of the plurality of portable units or any of the plurality of stationary units. The plurality of portable units, the plurality of stationary units, and the administrative unit can form a mesh network.

9 Claims, 14 Drawing Sheets

(51) Int. Cl.
*G07C 9/28* (2020.01)
*G08B 25/10* (2006.01)
*G08B 25/12* (2006.01)
*H04W 4/021* (2018.01)
*H04W 64/00* (2009.01)
*H04W 84/18* (2009.01)

(56) References Cited

U.S. PATENT DOCUMENTS

| | | | |
|---|---|---|---|
| 7,751,285 B1 | 7/2010 | Cain | |
| 7,880,610 B2 | 2/2011 | Tanner et al. | |
| 8,384,549 B2 | 2/2013 | Lemmon | |
| 2004/0252023 A1* | 12/2004 | Xydis | G08B 21/0227 340/539.11 |
| 2007/0077959 A1 | 4/2007 | Newman et al. | |
| 2007/0139190 A1* | 6/2007 | Tanner | G07C 1/20 340/539.13 |
| 2007/0194922 A1 | 8/2007 | Nathan et al. | |
| 2007/0296575 A1 | 12/2007 | Eisold et al. | |
| 2009/0098898 A1 | 4/2009 | Patterson | |
| 2010/0146426 A1 | 6/2010 | Parkulo et al. | |
| 2012/0212339 A1 | 8/2012 | Goldblatt | |
| 2013/0157684 A1* | 6/2013 | Moser | H04W 4/023 455/456.1 |
| 2016/0371619 A1* | 12/2016 | Foster | G06Q 10/0637 |
| 2017/0148075 A1 | 5/2017 | High et al. | |
| 2017/0357947 A1 | 12/2017 | Ilan et al. | |
| 2018/0151037 A1 | 5/2018 | Morgenthau et al. | |
| 2021/0393834 A1* | 12/2021 | Wellig | F24F 11/63 |

FOREIGN PATENT DOCUMENTS

| | | |
|---|---|---|
| CN | 105185062 A | 12/2015 |
| JP | 2017-169119 | 9/2017 |
| JP | 6235184 B1 | 11/2017 |
| JP | 2018-185224 | 11/2018 |
| WO | 2014/132272 | 9/2014 |

OTHER PUBLICATIONS

Al-Hadhrami, et al., "Power aware routing algorithms (PARA) in wireless mesh networks for emergency management," Plos one Oct. 13, 2018.

PCT International Application No. PCT/US20/42046, International Search Report and Written Opinion of the International Searching Authority, dated Dec. 21, 2020, 18 pages.

Office Action for Chinese Patent Application No. 202080051630.5, mailed Aug. 7, 2024, 9 pages.

* cited by examiner

SYSTEM AND METHOD FOR SECURING A FACILITY

CROSS-REFERENCE TO RELATED APPLICATIONS

This application is a National Stage of PCT/US2020/042046, filed Jul. 15, 2020, which claims the benefit of U.S. Provisional Patent Application No. 62/874,113, filed Jul. 15, 2019, which are incorporated by reference in their entireties.

FIELD OF THE DISCLOSURE

The present disclosure relates generally to security systems and, more particularly, is concerned with a method for, and a system for, securing a facility, such as a school building, or any like structure. In addition, embodiments of the present disclosure relate to systems and methods for tracking location positioning of individuals for applications such as infection response, contact tracing, general security systems, and other similar cases. In some embodiments, locations can be indoor, outdoor, or a combination of both. Furthermore, embodiments of the present disclosure relate to methods for determining and estimating levels of exposure and spread of an infectious disease.

BACKGROUND

In U.S. Pat. Application Publication No. 2012/0212339, Goldblatt disclosed a concealed personal alarm and method. In U.S. Pat. Application Publication No. 2007/0077959, Newman et al. disclosed an electronic locator. In U.S. Pat. No. 7,751,285, Cain disclosed a customizable and wearable device for electronic images. In U.S. Pat. No. 7,880,610, Tanner et al. disclosed a system and method that provide emergency instructions. In U.S. Pat. No. 8,384,549, Lemmon disclosed an event communication system for providing user alerts. In U.S. Pat. Application Publication No. 2007/0296575, Eisold et al. disclosed a disaster alert device, system and method. In U.S. Pat. No. 6,822,568, Gehlot et al. disclosed a space area network. In U.S. Pat. No. 3,694,579, McMurray disclosed an emergency reporting digital communications system. In Canadian Pat. No. CA 2,308,577, Shamim Ahmad disclosed a security and emergency alarm system. In WIPO International Publication No. WO2014/132272, Anand Sundararaj disclosed a method and system for optimal emergency communication.

While these devices may be suitable for the purposes for which they were designed, they would not be as suitable for the purposes of the present disclosure as hereinafter described. As will be shown by way of explanation and drawings, the present disclosure works in a novel manner and differently from the related art.

SUMMARY

According to one aspect of the present disclosure, a directional position system for use in a facility having rooms, hallways, and other areas can include a plurality of portable units carried or worn by selected users in the facility; a plurality of stationary units mounted in each of a number of locations within the facility; and an administrative unit. At least one of the portable units can include at least one button for sending a signal, when pressed, for a specific type of emergency situation. At least one of the stationary units can include a display for indicating a direction to move during an emergency situation. The administrative unit can be configured to be monitored by security personnel and can be configured to receive any signal transmitted from any of the plurality of portable units or any of the plurality of stationary units. The plurality of portable units, the plurality of stationary units, and the administrative unit can form a mesh network.

In some embodiments, each of the plurality of portable units, each of the plurality of stationary units, and the administrative unit can be in wireless communication with all other units in the mesh network and can be configured to receive all signals. In some embodiments, each of the plurality of portable units, each of the plurality of stationary units, and the administrative unit can be configured to interact with all other units in the mesh network. In some embodiments, at least one of the portable units can be a fully functional unit. The fully functional unit can include a plurality of buttons. Each button can be associated with directional instructions.

In some embodiments, in response to a button being pushed on the fully functional unit, at least a portion of the plurality of stationary units can be configured to receive a signal associated with the button from the fully functional unit; and illuminate at least one light on the display based on the directional instructions associated with the button. In some embodiments, at least a portion of the plurality of portable units can be configured to, while stationary, broadcast information to the administrative unit at a first pre-defined frequency.

In some embodiments, the at least a portion of the of the plurality of portable units can be configured to, in response to a button being pressed that sends a signal associated with a specific type of emergency, broadcast the information to the administrative unit at a second pre-defined frequency, wherein the second frequency is greater than the first frequency. In some embodiments, the at least a portion of the plurality of portable units can be configured to, in response to a deactivation signal from the administrative unit, broadcast the information to the administrative unit at the first frequency. In some embodiments, the information can include at least one of an ID associated with a portable unit; a location associated with the portable unit; a name associated with the portable unit; or a role associated with the portable unit. In some embodiments, the at least one of the plurality of portable units can be configured to, when moving, broadcast information to the administrative unit at a frequency higher than the first frequency.

According to another aspect of the present disclosure, a positioning alert system for use in a facility having rooms, hallways, and other areas can include a first plurality of portable units carried or worn by a first group of selected users in the facility; a second plurality of portable units carried or worn by a second group of selected users in the facility; a plurality of stationary united mounted in each of a number of locations within the facility; and an administrative unit. Each of the first plurality of portable units can include a plurality of buttons and a plurality of LEDs associated with a plurality of emergency situations. Each of the second plurality of portable units can include a plurality of LEDs associated with the plurality of emergency situations. The administrative unit can be configured to be monitored by security personnel and can be configured to receive any signal transmitted from any of the first or second plurality of portable units. The first and second pluralities of portable units, the plurality of stationary units, and the administrative unit can form a mesh network.

In some embodiments, each of the first and second pluralities of portable units, the plurality of stationary units, and the administrative unit can be in wireless communication with all other units in the mesh network and can be configured to receive all signals. In some embodiments, each of the first and second pluralities of portable units, each of the plurality of stationary units, and the administrative unit can be configured to interact with all other units in the mesh network. In some embodiments, at least a portion of the first and second pluralities of portable units can be configured to, while stationary, broadcast information to the administrative unit at a first pre-defined frequency.

In some embodiments, the at least a portion of the first and second pluralities of portable units can be configured to, in response to a button being pressed on one of the first plurality of portable units that sends a signal associated with a specific type of emergency, broadcast the information to the administrative unit at a second pre-defined frequency. In some embodiments, the second frequency can be greater than the first frequency. In some embodiments, the at least a portion of the first and second pluralities of portable units can be configured to, in response to a deactivation signal from the administrative unit, broadcast the information to the administrative unit at the first frequency.

In some embodiments, the information can include at least one of an ID associated with a portable unit; a location associated with the portable unit; a name associated with the portable unit; or a role associated with the portable unit. In some embodiments, the at least one of the first and second plurality of portable units can be configured to, when moving, broadcast information to the administrative unit at a frequency higher than the first frequency. In some embodiments, the second plurality of portable units can be configured to, in response to a button associated with an emergency being pushed on one of the first plurality of portable units, illuminate an LED associated with the emergency until a deactivation signal has been received from the administrative unit. In some embodiments, at least one of the first plurality of portable units can be configured to, in response to a button associated with an emergency being pushed on the at least one of the first plurality of portable units being pushed, broadcast a location associated with the at least one unit to the administrative unit.

According to another aspect of the present disclosure, a method for tracing spread of a disease in a wireless mesh network within a site can include obtaining information associated with a portable unit worn or carried by a selected user within the wireless mesh network; identifying, from the obtained information, rooms within the site that were entered by the portable unit within the timeframe; calculating, for each identified room, a room score; identifying a plurality of other portable units worn or carried by a plurality of other selected users within the wireless mesh network that entered each identified room within the timeframe; calculating, for each of the plurality of other portable units, an exposure score; and identifying portable units of the plurality of other portable units with an exposure score greater than a pre-defined threshold. The information can include location and time information for a pre-defined timeframe.

In some embodiments, the portable unit, each of the plurality of other portable units, and a plurality of stationary units can be in wireless communication with all other units in the mesh network and can be configured to receive all signals. In some embodiments, the portable unit, each of the plurality of other portable units, and the plurality of stationary units can be configured to interact with all other units in the mesh network. In some embodiments, each room in the site can be geofenced within the mesh network. In some embodiments, the room score for each identified room can be time-dependent. In some embodiments, for each identified room, the room score can be calculated based on a duration of time spent in each room by the portable unit.

In some embodiments, an infected score can be associated with the portable unit and calculating, for each identified room, the room score can include increasing the room score by a percentage of the infected score. The percentage can be proportional to a duration of time the portable unit spent in the room. In some embodiments, calculating, for each identified room, the room score can include decreasing the room score by a second percentage. The second percentage can be proportional to a duration of time since the portable unit left the room. In some embodiments, for each identified other portable unit, the exposure score can be calculated based on a duration of time spent in each identified room at a same time as the portable unit; and a duration of time spent in each identified room at a different time than the portable unit.

In some embodiments, an infected score can be associated with the portable unit and calculating, for each identified other portable unit, the exposure score can include increasing the exposure score by a percentage of the infected score and the room score. The percentage can be proportional to a duration of time the portable unit and the other portable unit spent in an identified room at the same time. In some embodiments, the location of a portable unit can be determined by analyzing a plurality received signal strength indicators (RSSI) from the plurality of stationary units.

According to another aspect of the present disclosure, a method for managing a capacity of an area can include configuring a geofence within a mesh network that can define an area within a site; establishing a capacity associated with the area; analyzing a location of a plurality of portable units worn or carried by a plurality of selected users within the mesh network; identifying a number of portable units located within the area; maintaining a current count of the number of portable units located within the area; and in response to the current count surpassing the capacity, generating an alert to an administrative unit. The administrative unit can be part of the mesh network.

In some embodiments, the mesh network can include a plurality of stationary units, wherein each of the plurality of portable units, each of the plurality of stationary units, and the administrative unit can be in wireless communication with all other units in the mesh network and can be configured to receive all signals. In some embodiments, each of the plurality of portable units, each of the plurality of stationary units, and the administrative unit can be configured to interact with all other units in the mesh network. In some embodiments, the location of a portable unit can be determined by analyzing a plurality received signal strength indicators (RSSI) from the plurality of stationary units.

In some embodiments, at least a portion of the plurality of portable units can be configured to, while stationary, broadcast information to the administrative unit at a first pre-defined frequency. In some embodiments, the at least one of the plurality of portable units can be configured to, when moving, broadcast information to the administrative unit at a frequency higher than the first frequency. In some embodiments, the information can include at least one of an ID associated with a portable unit; a location associated with the portable unit; a name associated with the portable unit; or a role associated with the portable unit. In some embodiments, at least one of the plurality of portable units can include a plurality of buttons for sending a signal to the administrative unit for a specific type of emergency. In some embodiments, a subset of the plurality of portable units can be configured to, in response to a button being pressed on the at least one of the plurality of portable units, illuminate an LED associated with the emergency until a deactivation signal has been received from the administrative unit.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
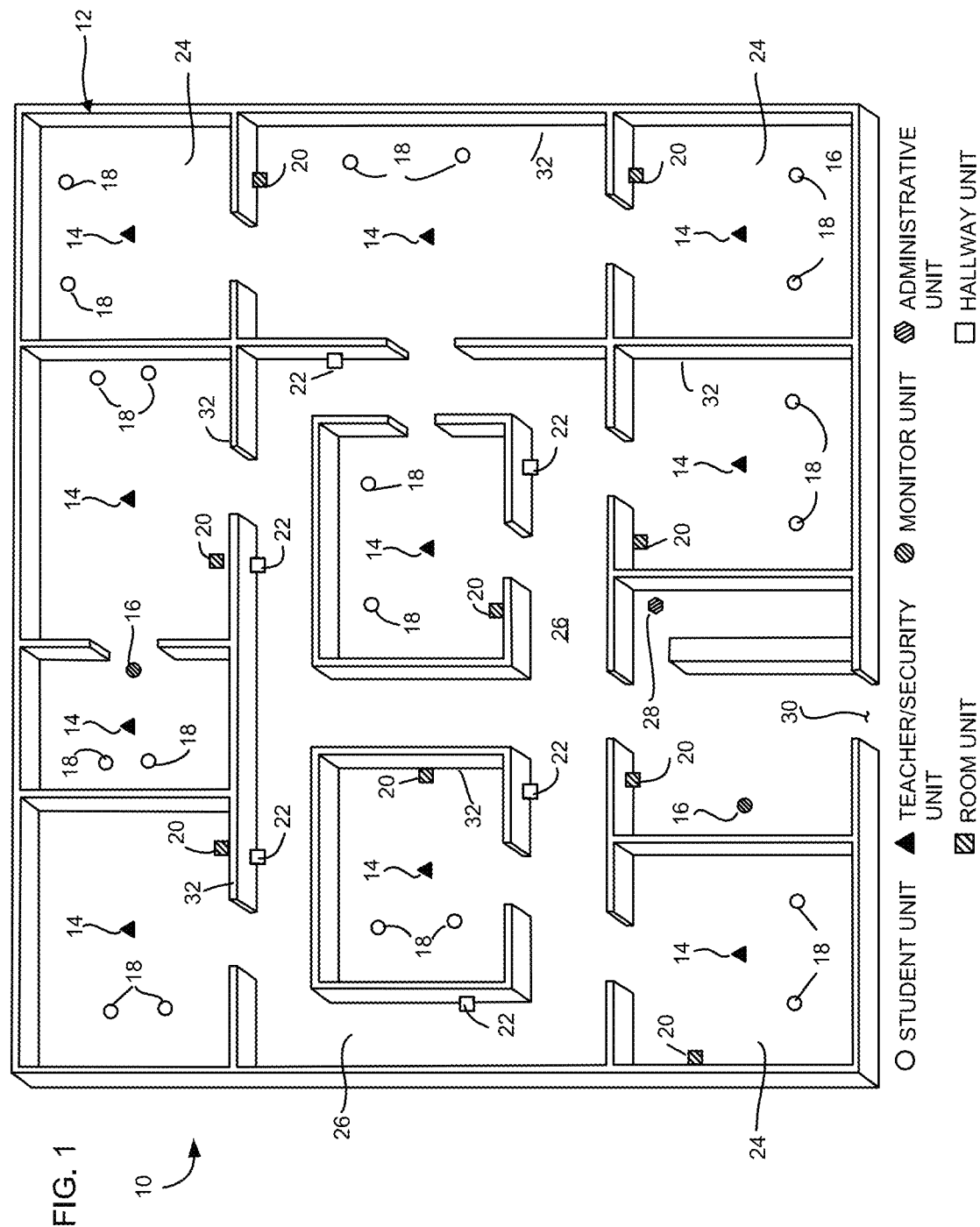
FIG. 1 is top plan view of an exemplary facility, such as a school building, showing an exemplary distribution of portable and stationary units in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The structural components of the security system have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure discloses a security system for, and a method of, communicating a security threat or event to all users of a facility, e.g., a school building, an office building, or any like structure, by means of a full mesh network topology. The mesh network can include a plurality of portable units (or nodes) carried by such users as teachers, security personnel, monitors, and students, in the facility, as well as a plurality of stationary units (or nodes) mounted on walls in rooms and passageways, such as hallways, in the facility. At least some of the units can have a plurality of buttons thereon, wherein each button is designated for a specific type of problem, for example, a medical emergency, a disturbance, such as a fight, a fire, an intruder, etc. If a user presses one of the designated buttons, then other members of the mesh network, including an administrative unit (or node) being monitored by other security personnel or by an administrator, can be notified of the type and the location of the threat within the facility. The portable units can be worn by the users who move throughout the facility. The stationary units, also known as beacons, can be fixed in position and strategically or selectively placed throughout the facility. For example, if an intruder is observed, then a user can actuate one of the buttons on the portable unit, or on a stationary unit, designated for intruders, and all the other units or nodes of the mesh network can be notified of the intrusion.

An object of the present disclosure is to provide a rapid response system for emergencies related to security of a facility. A further object of the present disclosure is to provide a security system, which notifies security personnel of the type of emergency along with the specific location of the emergency. A further object of the present disclosure is to provide a security system, which can be used to notify users that the facility is free of security problems and that school children, for example, can be evacuated from the facility. A further object of the present disclosure is to provide a security system, which can be used to direct people safely out of the facility. A further object of the present disclosure is to provide a security system, which can be easily operated by a user. A further object of the present disclosure is to adequately locate people in the facility in order to maintain the required security. A further object of the present disclosure is to provide a security system, which can be relatively easily and inexpensively manufactured.

Turning to FIG. 1, therein is shown an exemplary layout of the basic components of a security system 10 in use and positioned in an exemplary facility or building 12, for example, a school building, an office building, a manufacturing complex, a hotel, a factory, or any like structure. The building 12 can contain numerous rooms 24 bounded by walls 32 and passageways such as hallways 26, along with an entrance/exit 30 and is meant for illustration only, because it would be clear to one skilled in the art that the system 10 is useful for all types of facilities and layouts. As used herein, the term hallways 26 is intended to cover stairwells, fire escapes, and elevators, and like passageways.

The system of FIG. 1 can include a plurality of portable units 14 disposed throughout the facility 12, wherein the portable units 14 can be carried, or worn about the necks, or wrists, or on clothing, of teachers, who are typically located in the rooms 24, or of security personnel, who may be located anywhere in the facility 12. In some embodiments, portable units 14 may be referred to as "fully functional" units. Each portable unit 14 can have a unique ID associated with it. Portable units 14 can be configured to possess full incident reporting (described with respect to FIG. 10) and directive capabilities (described with respect to FIG. 10 In some embodiments, portable units 14 can be configured to possess repeater capabilities, but the capabilities may be toggled (e.g. by an administrative unit 28) in order to converse power and/or to reduce data queue time. In some embodiments, portable units 14 can be configured to automatically report their associated ID and location (e.g. to an administrative unit 28) at preset periods or a preset frequency. In some embodiments, the ID and location reporting can be performed in response to an interrogation (either automatic or manual) by an administrative unit 28. In some embodiments, ID and location reporting can also include a name, title, and role of a person associated with the portable unit 14.

In some embodiments, the location of a portable unit (e.g. portable unit 14, 16, and/or 18) can be determined via calculating the distance of the portable unit between multiple stationary units (e.g. stationary units 20, 22). For example, four stationary units can create a geofence (e.g. for a room), which can create a layout of a protected site. A portable unit can use an RSSI signal, described later in detail, to help determine its location. When portable units are moving between geofences, they can advertise themselves to discover new beacons. In some embodiments, when new beacons are discovered, the portable unit can analyze the signal strength across four beacons, and publish its location to the nearest one.

Also shown in FIG. 1 is a plurality of portable units 16, which can be carried, or worn about the necks, or wrists, or on clothing, of monitors, e.g., employees such as janitors working at the facility, who may also be located anywhere in the facility 12. Each portable unit 16 may also have a unique ID associated with it. In some embodiments, portable units 16 can possess annunciator capability (e.g. LEDs lighting up to convey information, similar to as described with respect to portable units 14) but may not possess incident reporting or directive dispatching functionality. For example, during an ongoing incident (to be described in greater detail with respect to FIG. 10) portable units 16 can be configured to brighten relevant LEDs but may not be configured to actually implement or report an incident. In some embodiments, portable units 16 can be configured to possess repeater capabilities, but the capabilities may be toggled (e.g. by an administrative unit 28) in order to converse power and/or to reduce data queue time. In some embodiments, portable units 16 can be configured to automatically report their associated ID and location (e.g. to an administrative unit 28) at preset periods or a preset frequency. In some embodiments, the ID and location reporting can be performed in response to an interrogation (either automatic or manual) by an administrative unit 28. In some embodiments, ID and location reporting can also include a name, title, and role of a person associated with the portable unit 16.

Also shown in FIG. 1 is a plurality of portable units 18, which can be carried, or worn about the necks, or wrists, or on clothing, of students, again typically located in the rooms 24. Each portable unit 18 may also have a unique ID associated with it. In some embodiments, portable units 18 may not possess any incident reporting, directive dispatching, or annunciating capabilities. In some embodiments, portable units 18 may have no displays other than a power status LED. In some embodiments, portable units 18 can be configured to automatically report their associated ID and location (e.g. to an administrative unit 28) at preset periods or a preset frequency. In some embodiments, the ID and location reporting can be performed in response to an interrogation (either automatic or manual) by an administrative unit 28. In some embodiments, ID and location reporting can also include a name, title, and role of a person associated with the portable unit 18. In some embodiments, portable units 18 can be configured to possess repeater capabilities, but the capabilities may be toggled (e.g. by an administrative unit 28) in order to converse power and/or to reduce data queue time.

As described previously, each of portable units 14, 16, and 18 can automatically report their associated ID and location (e.g. to an administrative unit 28). In some embodiments, this broadcasting of data can occur at set intervals, and the interval time can be set by the administrative unit 28, either in the firmware of the unit 28 or via an application that is under control of the administrative unit 28. In some embodiments, interval times for broadcasting data to the administrative unit 28 can vary depending on current incident levels. For example, during an "active incident," portable nodes 14, 16, and 18 can continuously report their associated ID, location, name, and role every three seconds until the active incident is resolved. In another example, during a "non-active incident" and while portable nodes 14, 16, and 18 are moving between stationary nodes 20 and 22, portable nodes 14, 16, and 18 can report their associated ID, location, name, and role every thirty seconds. Additionally, during a non-active incident and when portable nodes 14, 16, and 18 have been in proximity of the same stationary nodes 20 and 22 as the last time data was reported, the portable nodes 14, 16, and 18 can report their associated ID, location, name, and role every ten minutes. Note, the absolute frequencies here are merely exemplary in nature; rather, the portable nodes 14, 16, and 18 can be generally configured to report at a higher frequency during active incidents than non-active incidents and at a higher frequency while moving than while stationary. Note, as used herein, the term "stationary" can mean within an area in which the nearest stationary node remains the same (e.g. within a classroom when a stationary node is mounted adjacent to the classroom). In some embodiments, any "broadcast" of location data can also include a time-stamp (e.g. date and time) associated with the currently broadcast location. In some embodiments, information broadcast to an administrative unit 28 can be stored in a database and indexed by ID (e.g. ID of the associated portable unit). In some embodiments, the database can be a part of the administrative unit 28, an external database, or a combination of both.

In some embodiments, a portable node (e.g. portable nodes 14, 16, 18) can be configured to report its location via a received signal strength indication (RSSI) methodology. For example, broadcast data from the portable node is sent to the stationary nodes (e.g. stationary nodes 20 and 22) immediately surrounding the portable node. The stationary nodes that received the broadcast data can, in turn, send back RSSI information to the portable node. In response to receiving the RSSI information, the portable node can publish its location to the stationary node that yielded the strongest RSSI signal.

Also shown in FIG. 1 is a plurality of stationary units 20, which can be mounted (e.g. permanently mounted) on the wall(s) 32 of the room(s) 24 of the facility 12. In some embodiments, stationary units 20 can possess repeater functionality (e.g. configured to participate as part of a mesh network). Each stationary unit 20 can have a unique ID associated with it. In some embodiments, the battery of a stationary unit 20 can be charged or continuously charged from a constant power source. In some embodiments, each stationary unit 20 can have a power status indicated by an LED (e.g. green, orange, red, etc.). In some embodiments, stationary units 20 can also be configured to utilize an emergency power duty cycle, which may become available upon an interruption of the power source. In some embodiments, stationary units 20 may only report its ID and location under the control of administrative unit 28.

In some embodiments, the system of FIG. 1 can also include a plurality of additional stationary units 22, which can be mounted on the wall(s) 32 (e.g. permanently mounted) and strategically located in the facility 12 in passageways such as the hallways 26. Similar to stationary units 20, stationary units 22 can also possess repeater functionality and participate as part of the mesh network. In some embodiments, stationary units 22 can also be configured to possess status and direction annunciator capabilities. For example, stationary units 22 can display LEDs that are responsive to various ongoing incidents (described in greater detail with respect to FIG. 11). Stationary units 22 can also include an LED display to implement directional instructions. For example, the LED display can include a group of LEDs that can indicate a horizontal direction and another group of LEDs that can indicate a vertical direction. In some embodiments, the LED display of stationary units 22 can be configured to indicate a direction for people to follow. Additionally, each stationary unit 22 can have a unique ID associated with it. In some embodiments, the battery of a stationary unit 22 can be charged or continuously charged from a constant power source. In some embodiments, each stationary unit 22 can have a power status indicated by an LED (e.g. green, orange, red, etc.). In some embodiments, stationary units 22 can also be configured to utilize an emergency power duty cycle, which may become available upon an interruption of the power source. In some embodiments, stationary units 22 may only report its ID and location under the control of administrative unit 28.

Also shown in FIG. 1 is an administrative unit 28, which may be stationary and placed in an administrative portion of the facility 12, such as a main office. In some embodiments, the administrative unit 28, which can include a computer, can be monitored by dedicated security personnel or by an administrator. The administrative unit 28 may also be portable and carried or worn by the administrator. For example, the administrative unit 28 may be incorporated in a cell phone. In some embodiments, the administrative unit 28 can include a control center and can be configured to control all other nodes within the network (e.g. both portable and stationary units). In some embodiments, the administrative unit 28 can display a site map, node/unit info, messages and directives. Additionally, for example using an application, the administrator, via the administrative unit 28, can direct any node or unit to exhibit repeater capability or deactivate repeater capability. For example, toggling of repeater capability can be used to conserve power and/or to reduce data queue time.

Additionally, as described previously, all nodes (both portable and stationary) can be configured to participate as part of the mesh network within FIG. 1. However, all nodes may not always be active. For example, stationary nodes 20 and 22 can be configured to operate in a continuous response fashion; in other words, stationary nodes 20 and 22 can be configured to continuously act as repeaters that relay mesh message data between each other and to the administrative unit 28. Portable nodes 14, 16, and 18 can be configured to have their repeater functionality either be toggled or automatic. For example, in the toggled version, a portable node 14, 16, and/or 18 can operate with repeater functionality in response to receiving an activation signal from the administrative node 28. For automatic repeater functionality, portable nodes 14, 16, and 18 can be configured to operate as repeaters as a safeguard. For example, if a stationary node 20 or 22 is detected within the system as not working or being inoperable, an activation signal can be sent from administrative unit 28 to the portable node nearest the broken stationary node.

Figure 2:
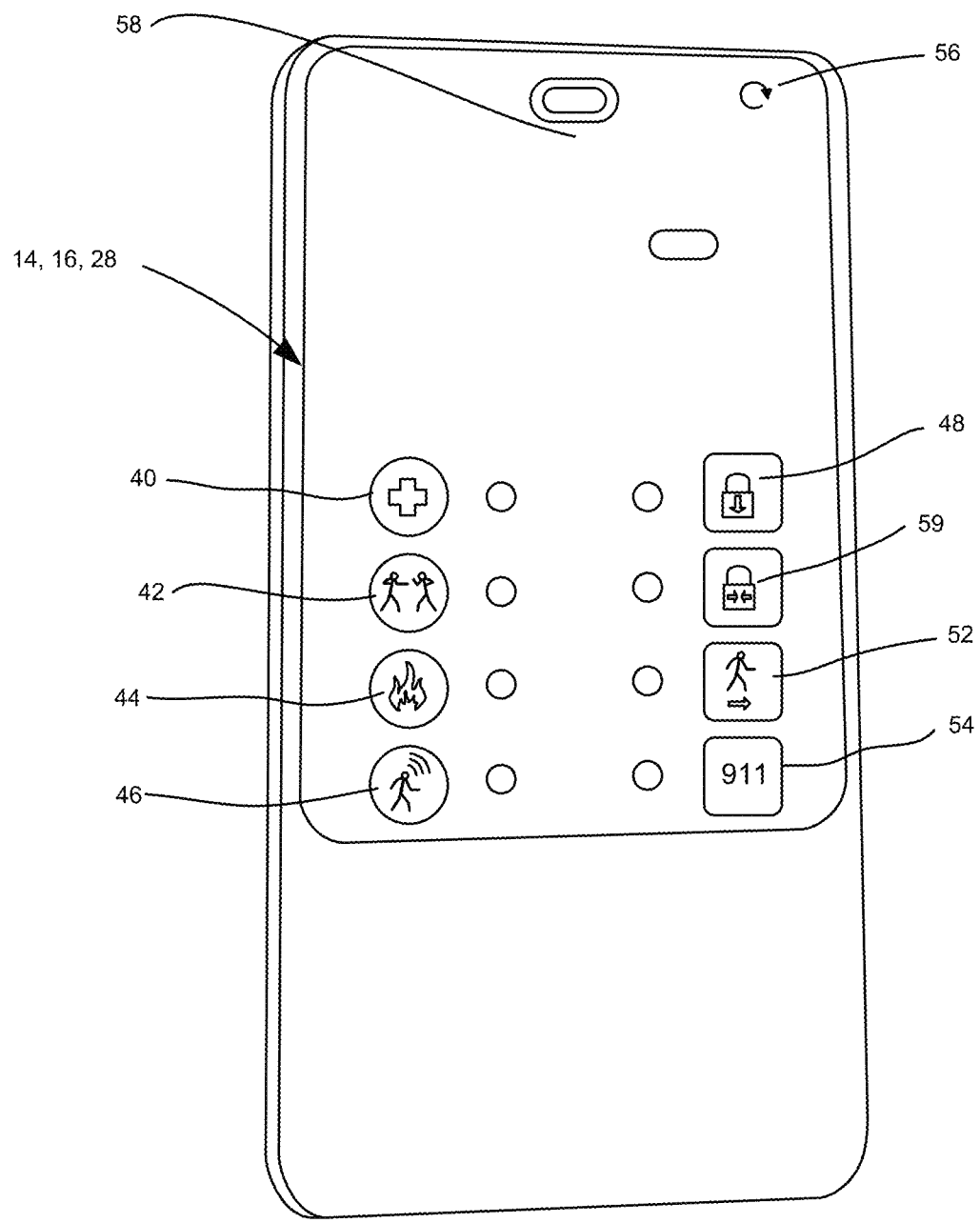
FIG. 2 is an enlarged of a representative portable unit, according to some embodiments of the present disclosure.

Turning to FIG. 2, therein is shown a typical portable unit 14, 16, 28, which can be worn by a teacher/security person, or an administrator. Each unit 14, 16, 28 can have a plurality of buttons thereon, where each button can be associated with a different occurrence or event. For example, a button 40 can be designated for a medical emergency; a button 42 can be designated for a disturbance, such as a fight; a button 44 can be designated for a fire; a button 46 can be designated for an intruder; a button 48 can be designated for a lock-down directive; a button 50 can be designated for a lock-in directive; a button 52 can be designated for a relocation directive; and a button 54 can be designated for an urgency directive, such as an evacuation. An LED can be associated with each button. A power switch 58 is also shown. In some embodiments, when the power stich 58 is turned "on" or cycled on all nodes within a system (portable and/or stationary), a unit test can be initiated under the control of an administrative unit (e.g. administrative unit 28 of FIG. 1). If all things are "go," a message can be generated, such as a message saying "I'm okay" with ID and location data. Further, a power LED 56 can blink via a "hand-shake" reassuring a user that the system is aware of their presence and can respond appropriately. This process can be performed any time as required by switching the power switch 58 "off" and then back "on."

LED 56 can also monitor the unit's power state by its color (e.g., red, orange, green). In some embodiments, the power led 56 can be red when less than a 10% charge remains, orange when a 10-60% charge remains, and green when a 60-100% charge remains. Note, these values are merely exemplary in nature and other values and/or colors may be used. If one of the designated buttons is pressed, then other members of the mesh network, including the administrative unit 28 being monitored by the other security personnel or by the administrator, are immediately notified of the type and the location of the threat within the facility 12. The typical portable unit 18 worn by a student, or the stationary units 20 need not have any of these buttons, except for the power switch 58 and the power monitor 56.

Figure 3:
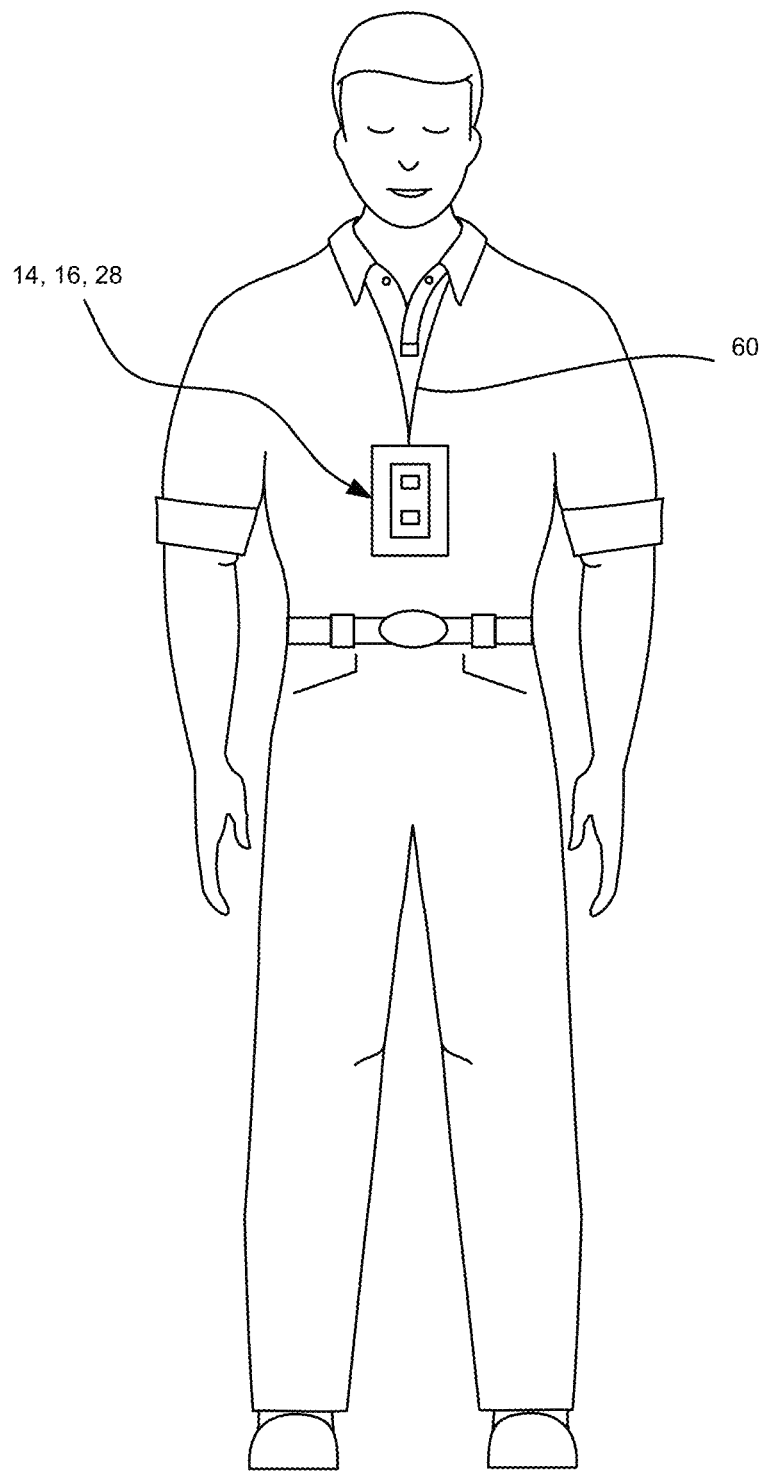
FIG. 3 is a schematic view of a portable unit worn by a user, according to some embodiments of the present disclosure.

Turning to FIG. 3, therein is shown a typical user wearing a portable unit about his neck, wherein the portable unit 14 can be suspended on a lanyard 60 as would be done by one skilled in the art. The portable unit 14 may also serve as a photo ID. There are also other ways to carry or otherwise attach the portable unit 14 to the user. The portable unit can be approximately the size of a credit card and light in weight.

Figure 4:
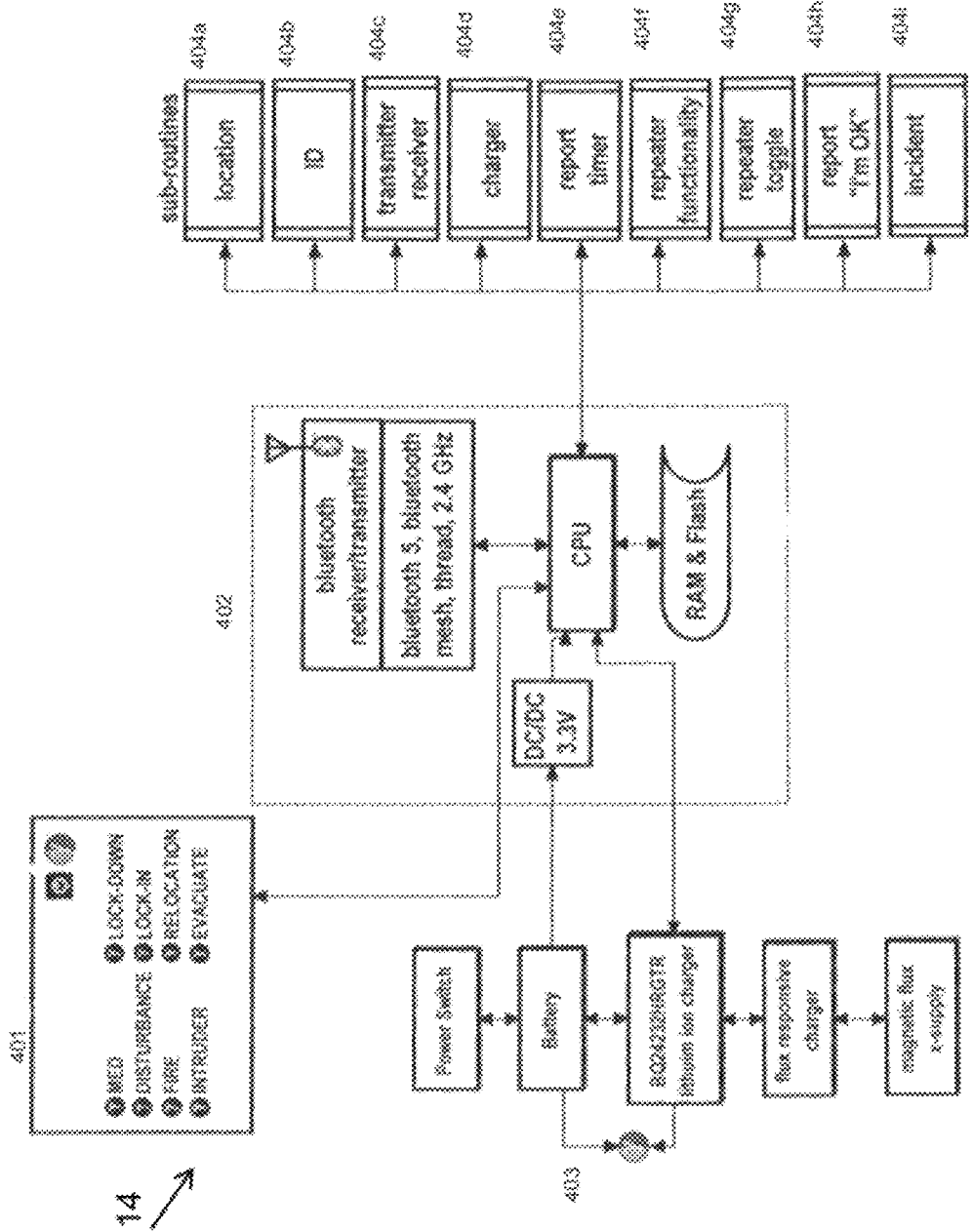
FIG. 4 is block diagram of a portable unit worn by a teacher/security person, according to some embodiments of the present disclosure.

FIGS. 4-8 are block diagrams showing the units 14, 16, 18, 20 and 22, respectively, depicting various functions performed by their respective on-board processors, according to some embodiments of the present disclosure. In FIG. 4, unit 14 can be fully functional. Portable unit 14 can include an interface 401 with power buttons and a power LED, as well as specific emergency buttons, as described elsewhere in this disclosure, such as medical emergencies, disturbances, fires, and intruders. Interface 401 can also include buttons and LEDs to report and/or initiate directive protocols, such as lock-downs, lock-ins, relocations, and evacuations. Portable unit 14 can also include communications and computing functionality 402 and a power source 403. In some embodiments, portable unit 14 can include a variety of sub-routines 404a-i, such as location determination (404a), ID maintenance (404b), a transmitter/receiver (404c), a charger (404d), a report timer (404e), repeater functionality (404f), a toggle for the repeater functionality (404g), functionality to report an "I'm okay" message (404h), and incident reporting when a button is pressed on the interface 401 (404i).

Figure 5:
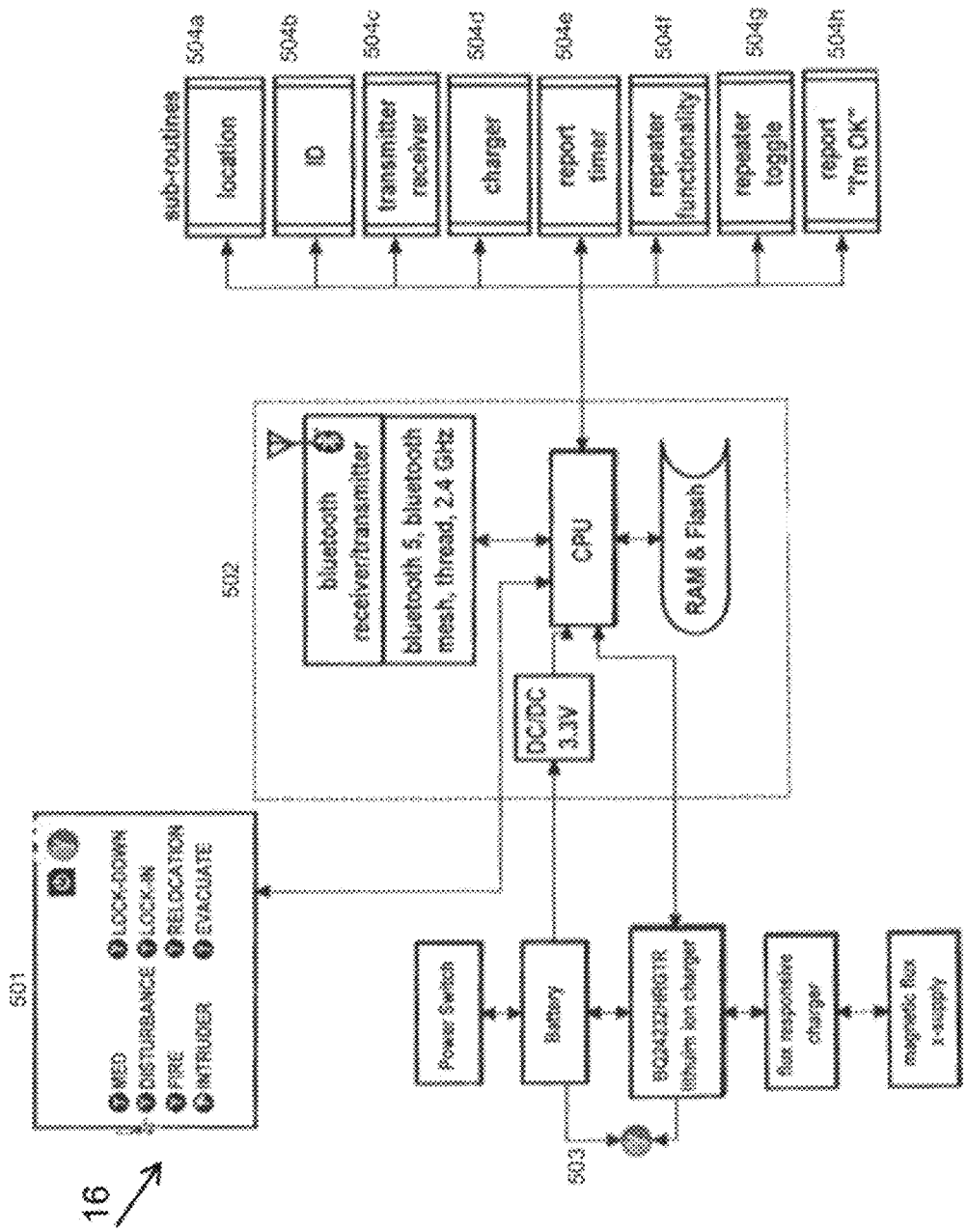
FIG. 5 is a block diagram of a portable unit worn by a monitor, e.g., an employee of the facility, according to some embodiments of the present disclosure.

Portable unit 16 is shown in FIG. 5, which can lack incident reporting. In some embodiments, portable unit 16 can include a similar interface 501 to portable unit 14, but without the incident buttons. Note, in some embodiments, it is possible for portable unit 16 to include the same functionality for incident reporting as portable unit 14. Portable unit 16 can include similar communications and computing functionality 502 and power source 503 to portable unit 14 in FIG. 4. Additionally, portable unit 16 can include many of the same sub-routines (504a-h) as portable unit 14, with the exception of incident reporting.

Figure 6:
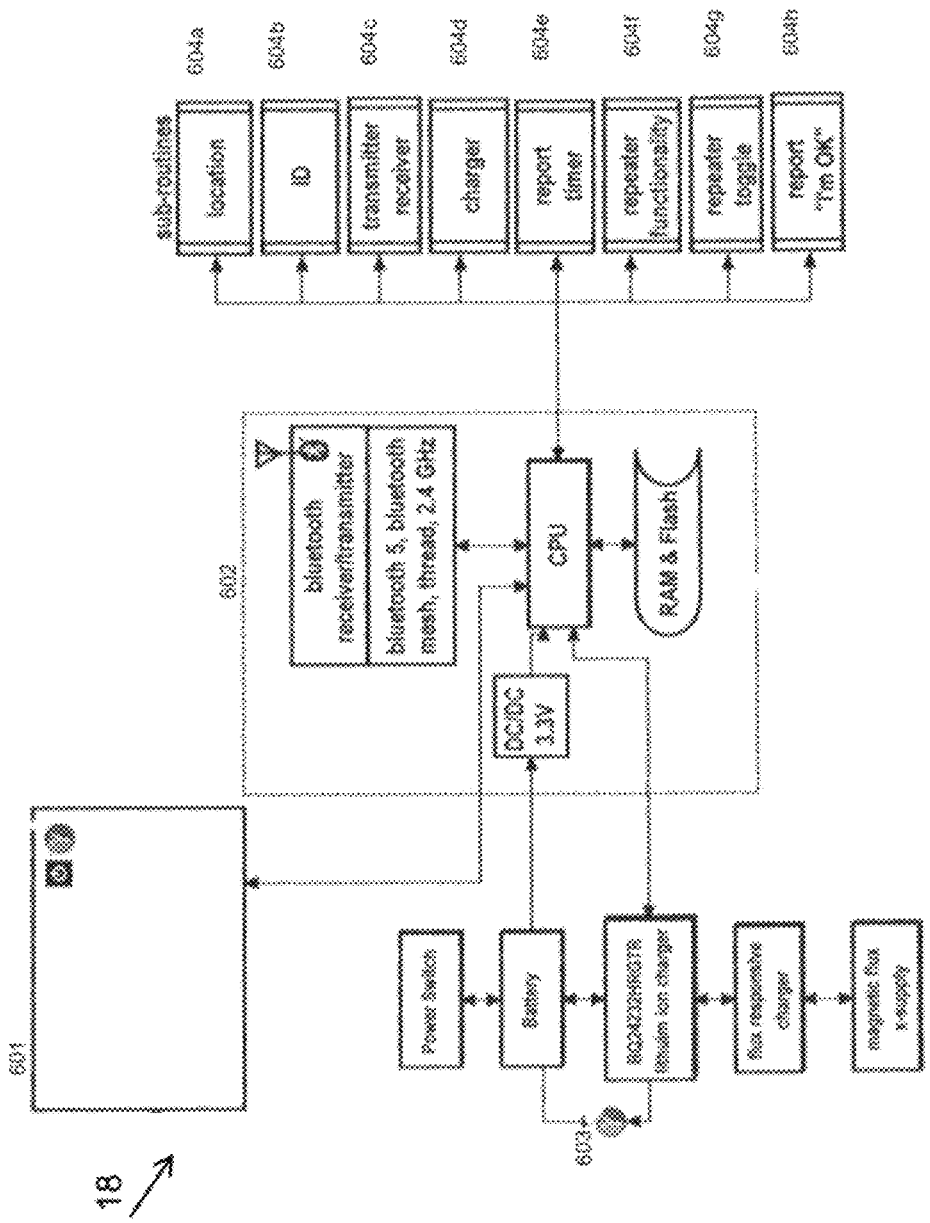
FIG. 6 is a block diagram of a portable unit worn by a student, according to some embodiments of the present disclosure.

Portable unit 18 can be shown in FIG. 6. In some embodiments, the interface 601 can lack all reporting buttons and LEDs as described in relation to FIGS. 4 and 5 but can still include a power button and power LED. Portable unit 18 can include similar communications and computing functionality 602 and power source 603, as well as similar sub-routines (604a-h), with the exception of incident reporting.

Figure 7:
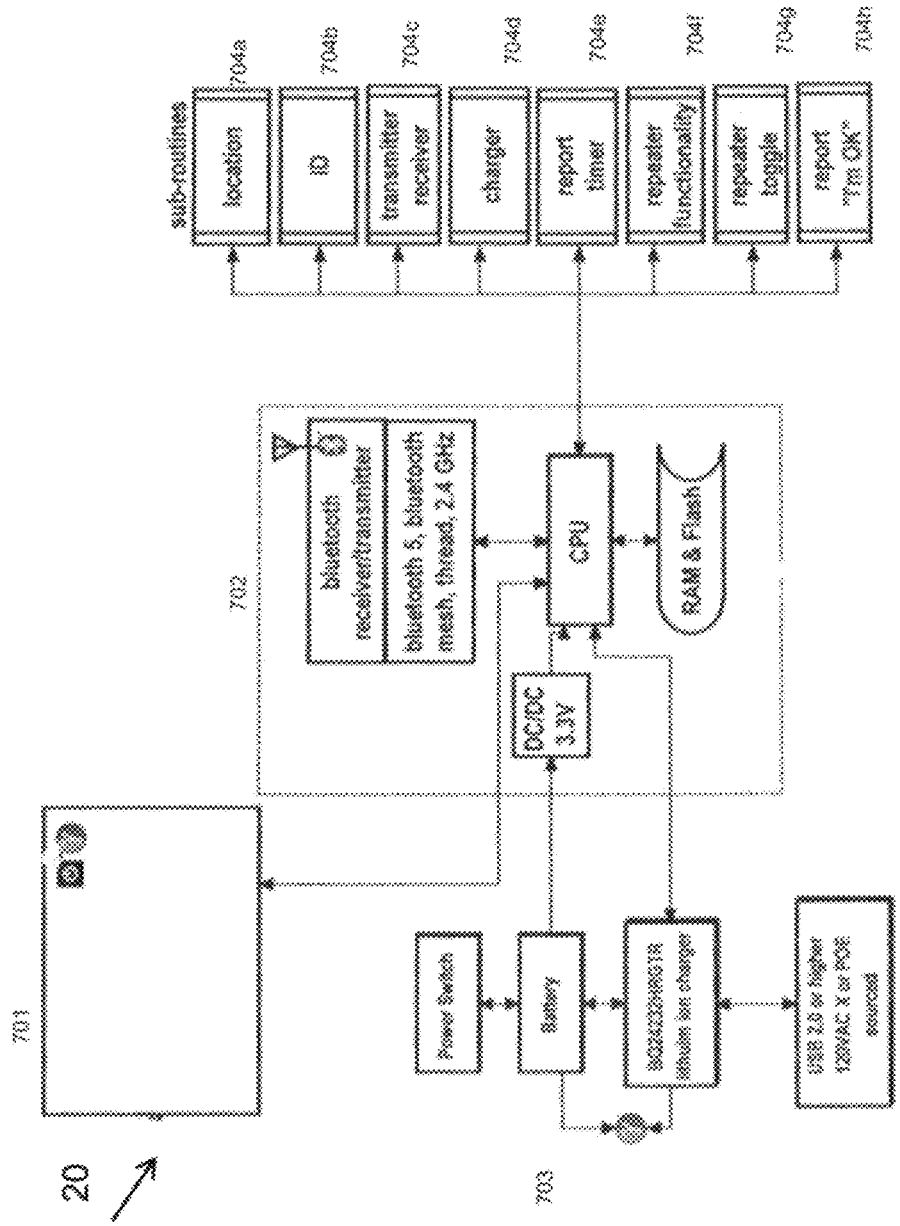
FIG. 7 is a block diagram of a stationary unit mounted in a room, according to some embodiments of the present disclosure.

Stationary unit 20 can be shown in FIG. 7. Stationary unit 20 can include an interface 701 with no buttons and LEDs except for a power LED and power button. Stationary unit 20 can include similar communications and computing functionality 702 and power source 703, although power source 703 can also be hard-wired to a more permanent power source. In some embodiments, stationary unit 20 can include sub-routines 704a-h, which may not include incident reporting.

Figure 8:
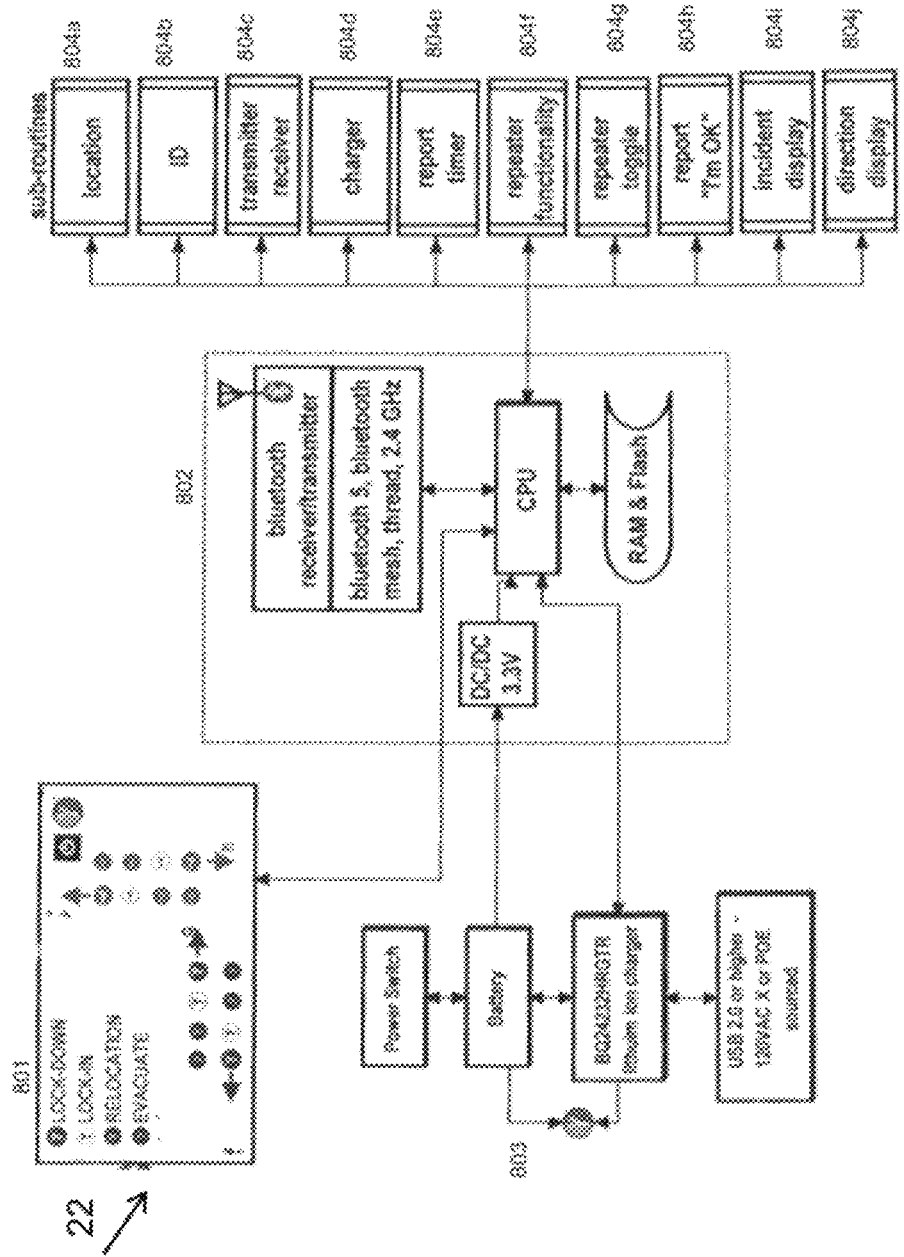
FIG. 8 is a block diagram of a stationary unit mounted in a passageway, such as a hallway, according to some embodiments of the present disclosure.

Stationary unit 22 can be shown in FIG. 8. Stationary unit 22 can include an interface 801, which may not have buttons for incident reporting but may include LEDs associated with emergencies, a power button and power LED, and directional LEDs for implementing directive protocols. Stationary unit 22 can include a similar communications and computing functionality 802 and power source 803 (although power source 803 may also be hard-wired to a permanent power source). Additionally, stationary unit 22 can include various sub-routines that are similar to or the same as mentioned in respect to FIGS. 4-7 (e.g. sub-routines 804a-h). However, in some embodiments, stationary unit 22 can also include incident display 804i and direction display 804j. In some embodiments, the directional display can include arrows (e.g. left, right, up, down, etc.) to indicate a direction to move to individuals within a protected site.

In some embodiments, the administrative unit 28 can be powered by a rechargeable battery when configured as a cell phone or laptop computer and is powered by a hard-wired power source when configured as a desk-top computer.

Figure 9:
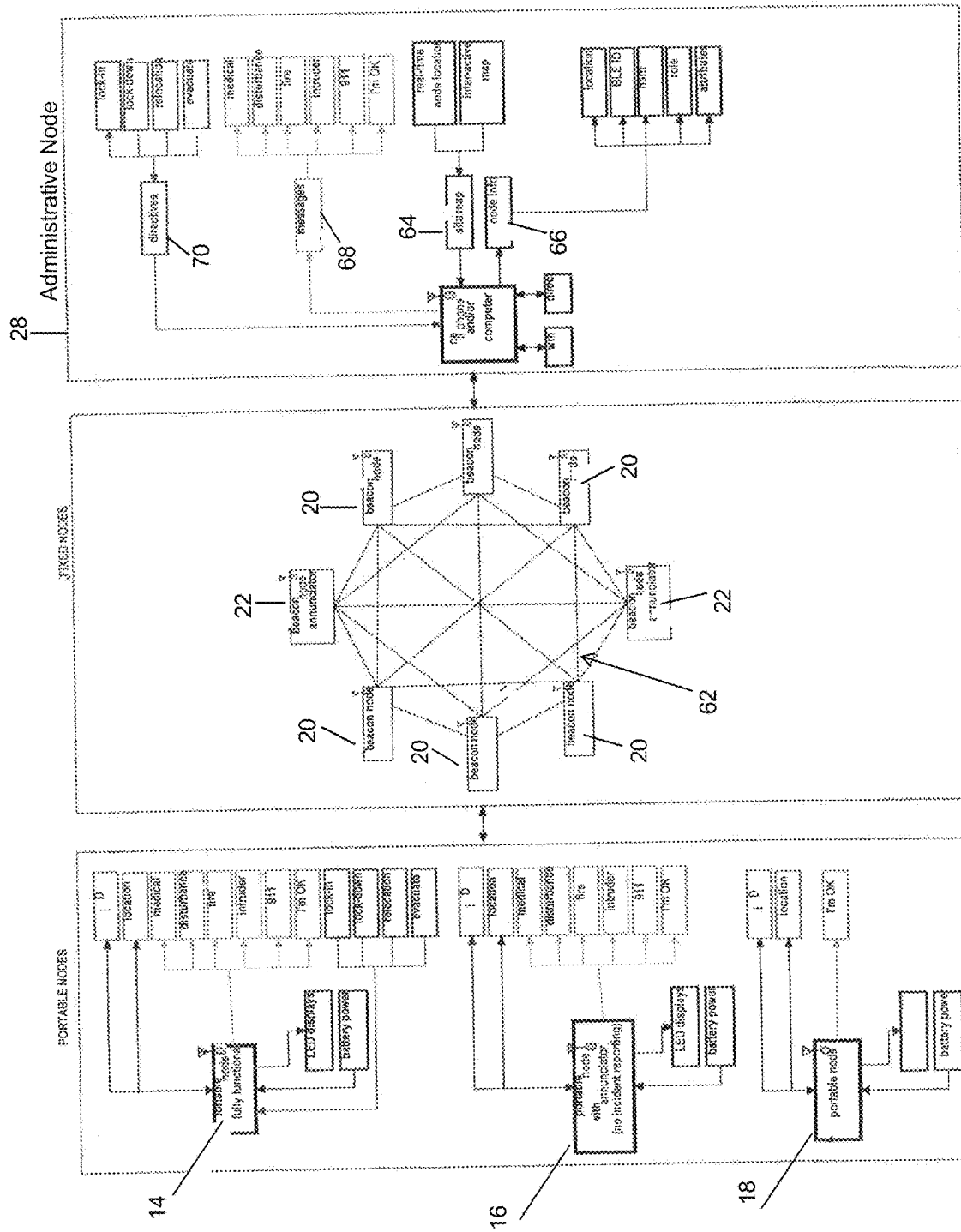
FIG. 9 is a block diagram of multiple units mounted in communication with an administrative unit over a mesh network, according to some embodiments of the present disclosure.

Turning to FIG. 9, therein is shown a conventional, full mesh wireless network topology having the individual member units or nodes 20, 22, also known as beacons, that function as repeaters, of a mesh network 62, wherein the previously disclosed units or nodes 14, 16, 18, 20, 22, 28 are also members of the network 62. A characteristic of mesh networks is that each unit/node communicates with each other unit/node, wherein the lines of communication are illustrated by dashed lines 30, which is intended to be illustrative of an electronic, wireless means, e.g., Bluetooth/Wi-Fi, of communication between the units/nodes of the mesh network. For example, if a button or like user activation mechanism on portable unit 14 is actuated by a user, then a signal would be sent wirelessly to each other unit/node of the network 62. Each unit/node has a central processing unit capable of processing the required information for the network 62 to function properly, which would include, but not be limited to, information about the type or identification, location, time, and type of emergency or security threat occurring, and any other information necessary for the proper functioning of the network 62, as hereinafter disclosed. The system 10 would be designed for any size of network 62, for example, even having 100-200 nodes or more.

The administrative unit or node 28 is configured, as previously mentioned, and as shown in FIG. 9, as a computer or cell phone, either of which has a display on which a site map 64, node info 66, messages 68 and directives 70 are displayed. The administrative node 28 is a control center for controlling all the other nodes. Thus, an administrator can readily view the display and immediately ascertain where the emergency occurred in the facility, and what type of emergency is present, and can readily respond to the emergency.

Figure 10:
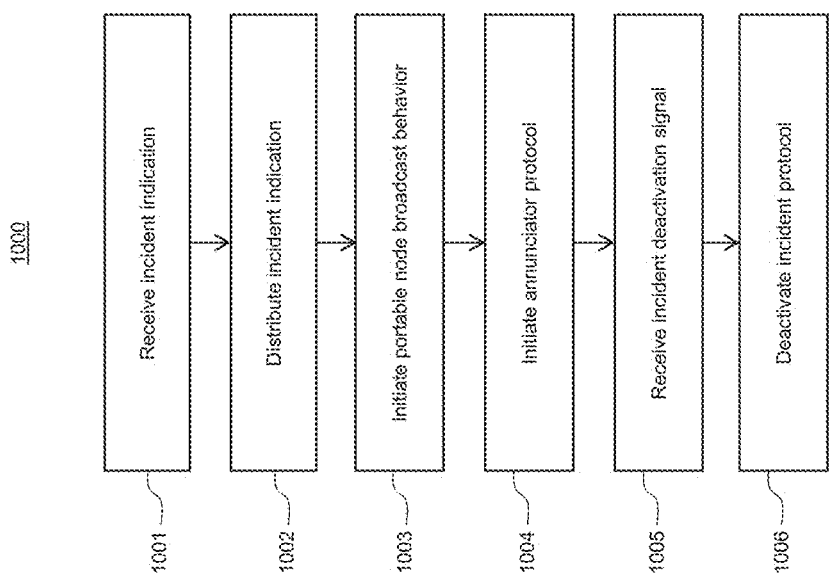
FIG. 10 is an example process for activating an incident protocol that can be performed within the system of FIGS. 1 and 9, according to some embodiments of the present disclosure.

FIG. 10 is an example process 1000 for activating an incident protocol that can be performed within the system of FIGS. 1 and 9, according to some embodiments of the present disclosure. In some embodiments, process 1000 can be performed within system 10 of FIG. 1 and can occur as a security protocol in response to an incident at a protected location, such as a school or similar facility. At block 1001, a portable unit 14 (e.g. fully functional unit) can receive an incident indication. For example, fully functional unit 14 can be worn or carried by a teacher or a security personnel within the protected location. In response to noticing that an incident has begun, the teacher or security personnel can press one of the plurality of buttons on fully functional unit 14 (e.g. one of buttons 40-46 as described in FIG. 2). For example, if a teacher notices a fire, the fire button 44 can be pressed, initiating an incident indication. Note, buttons 40-46, as described in FIG. 2 are merely exemplary in nature; additional and/or different incidents could be reflected by their own buttons on a fully functional unit 14.

At block 1002, in response to receiving an incident indication (e.g. from the push of an incident button), the fully functional unit 14 on which the button was pushed can distribute the incident indication. In some embodiments, the fully functional unit 14 can distribute the incident indication to every other node within system 10, including portable units 16 and 18 (e.g. janitors and students, respectively), other portable units 14 (e.g. other teachers and/or security personnel), stationary nodes 20 and 22, and the administrative unit 28. In some embodiments, in response to receiving an incident indication by the push of a button (e.g. at a fully functional unit 14), the location of the fully functional unit 14 can also be immediately broadcast to the administrative unit 28. This can allow for an administrator to know the location of an incident quickly after its occurrence.

At block 1003, in response to receiving an incident indication from the original fully functional unit 14, each portable node that has received the incident indication can initiate broadcast behavior according to an active incident. As described previously, active incident reporting causes portable units 14, 16, and 18 to more frequently broadcast information (e.g. location, name, ID, and role) to the administrative unit 28 than they would during a non-active incident porting protocol or during normal, every-day operation. For example, active incident reporting can involve portable units 14, 16, and 18 broadcasting every three seconds.

At block 1004, in response to receiving an incident indication from the original fully functional unit 14, portable nodes 14 and 16 and administrative unit 28 can initiate an annunciator protocol. In some embodiments, each node's annunciator protocol can include causing illumination of the respective nodes LED. Referring back to FIG. 2, portable units 14 and 16 can include an LED next to each button 40-46. Thus, in response to one fully functional unit 14 initiating an incident protocol in response to an incident button being pressed, other fully functional units 14 can illuminate their corresponding LED. For example, if a teacher carrying a fully functional unit 14 were to press the fire button 44, the incident indication would be sent from fully functional unit 14 to other fully functional units 14 and portable units 16 within the system (as well as administrative unit 28), causing the LED next to the fire button 44 to be illuminated on other devices, as well. In some embodiments, LED illumination can result when a signal has been successfully received and acknowledged by the system (e.g. a "handshake"). In some embodiments, LED illumination in an annunciator protocol can be constant (either blinking or steady) until a deactivation signal has been received from administrative unit 28. Note, administrative unit 28 can also include annunciator protocols and can illuminate a corresponding LED in response to receiving an incident indication.

At block 1005, upon portable nodes 14, 16, and 18 (including the original fully functional unit 14) can receive an incident deactivation signal from administrative unit 28. For example, upon the de-escalation of an incident (e.g. putting out of a fire, person receives medical attention, fight dispersed, etc.), an administrator can cause the incident deactivation signal to be sent out from administrative unit 28. At block 1006, in response to receiving the incident deactivation signal, each portable unit 14, 16, and 18 can deactivate their associated incident protocol. For example, portable units 14, 16, and 18 can all return to non-active incident reporting and begin to broadcast information to administrative unit 28 at a lower frequency (e.g. every thirty seconds). Additionally, portable units 14, 16, and 28 can de-illuminate their corresponding LEDs.

In some embodiments, there can be various levels of incident reports. For example, a first level can include incidents that can be handled by personnel on-site (e.g. security personnel, teachers, and/or administrators). A first level incident can be initiated by pressing one of the incident buttons on a fully functional unit 14, such as a medical button 40 or disturbance button 42. Level one medical incidents can include cuts, bruises, and other injuries that would not require external help and can suffice with internal help (e.g. a nurse or person qualified in first-aid). Level one disturbances can include fights between students or employees that would not require the external help of police and can be handled by administrative and/or internal security. In some embodiments, a second level incident can include incidents that require external help. A second level incident can also be initiated by pressing buttons on a fully functional unit 14. In some embodiments, a second level incident can be initiated by pressing an incident button (e.g. medical button 40 or disturbance button 42) simultaneously with an urgency icon button (e.g. button 54 of FIG. 2). Level two medical incidents can include broken bones, excessive bleeding, unconsciousness, and other occurrences that can require emergency medical personnel. Level two disturbances can include serious fights or altercations that require police assistance. In some embodiments, level three incidents can be associated with higher levels of emergency and require substantial immediate responses. Level three incidents can include incidents such as fires or intruders. A third level incident can be initiated via a fully functional device 14 by pressing button 44 or button 46. In some embodiments, a third level incident can also include directive procedures, which are described in relation to FIG. 11.

Figure 11:
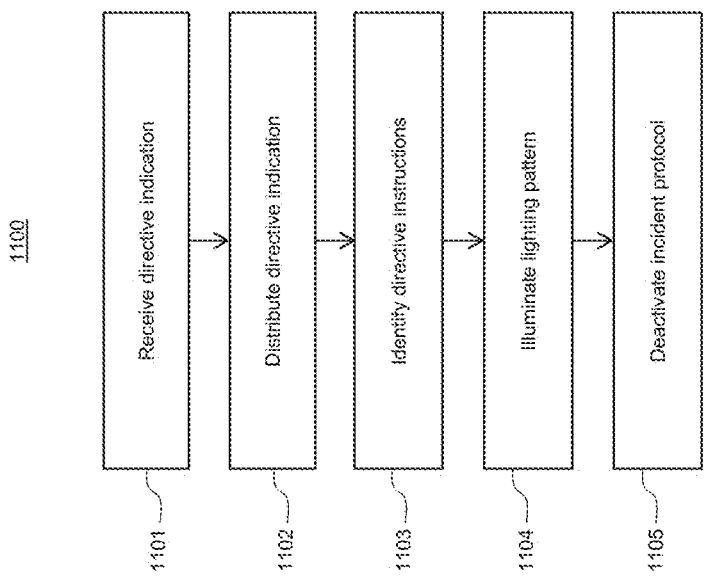
FIG. 11 is an example process for activating a directive protocol that can be performed within the system of FIGS. 1 and 9, according to some embodiments of the present disclosure.

FIG. 11 is an example process 1100 for activating a directive protocol that can be performed within the system of FIGS. 1 and 9, according to some embodiments of the present disclosure. In some embodiments, process 1100 can be performed within system 10 of FIG. 1 to initiate a directive signaling protocol. A directive signaling protocol can cause various nodes within system 10 to broadcast directive instructions around the protected facility to assist persons with movement within the facility.

At block 1101, a portable unit 14 (e.g. fully functional unit) can receive a directive indication. For example, fully functional unit 14 can be worn or carried by a teacher or a security personnel within the protected location. In response to noticing that a serious incident or incident requiring directions has begun, the teacher or security personnel can press one of the plurality of buttons on fully functional unit 14 (e.g. one of buttons 48-54 as described in FIG. 2). For example, button 48 can correspond to a lock-down directive procedure, button 50 can correspond to a lock-in directive procedure, button 52 can correspond to a relocation directive procedure, and button 54 can correspond to an evacuation procedure. As described herein, a lock-down procedure can be used to prevent a threat from entering a building or an exterior area and can direct staff to lock all doors and windows, barricade entryways, and hide in pre-assigned locations. A lock-in procedure can be used to direct a population within a protected facility to lock all doors and stay in place but continue with normal operations. A relocation procedure (e.g. shelter-in-place) can be used to direct a population within a protected facility to a pre-assigned shelter entity (e.g. in response to a weather event or an intruder on or near the facility) or to another secure location (e.g. when a tornado is moving from the south and has changed direction to the west). An evacuation procedure can be used to direct a population to leave the facility immediately. It is important to note that the directive procedures described herein are merely exemplary and other and/or additional directive procedures can be implemented within the system of the present disclosure.

At block 1102, in response to receiving a directive indication from the push of a button, the fully functional unit 14 can distribute the directive indication to other nodes within system 10, including other portable nodes 14, 16, and 18; stationary nodes 22; and administrative unit 28. In some embodiments, portable nodes 14 and 16, in response to receiving the directive indication, can be configured to illuminate the LED corresponding to the selected incident at the original fully functional unit 14, such as described in relation to FIG. 10. At block 1103, stationary nodes 22 can identify instructions associated with the received directive indication (e.g. directional instructions). For example, stationary nodes 22 can identify a pattern to display via its LEDs that is pre-programmed according to the specified directive indication in order to provide appropriate directions. In the case of an evacuation incident, stationary nodes 22 can illuminate arrows that point toward the nearest exit or emergency exit. In the case of a relocation incident, stationary nodes 22 can illuminate arrows that point toward the nearest secure shelter. Note, as stationary nodes 22 can be located on the walls of hallways and passageways, this can serve to noticeably indicate to people within the facility which direction to move. At block 1104, the stationary nodes 22 can illuminate the identified lighting pattern based on the directive indication. In some embodiments, stationary nodes 22 can remained illuminated until explicitly deactivated by the administrative unit 28, upon the completion of an incident. At block 1105, the administrative unit 28 can deactivate incident protocol among stationary nodes 22 and portable units 14 and 16.

As described previously, information that is broadcast to an administrative unit can be stored in a database and indexed by ID, and this information can include time-stamp information and location information. Accordingly, information stored via the systems of FIGS. 1 and 9 can allow for historical movements of various portable units to be tracked and analyzed; in other words, the system of the present disclosure can also be used to perform contact tracing and various other tasks, processes, and/or calculations related to analysis of historical locations, movements, proximities, and durations. Due to the mesh network setup as described with respect to the systems of FIGS. 1 and 9, locations can be accessed and tracked in a more accurate manner (e.g. down to the precision of feet), which can allow for more accurate and effective contact tracing. Accordingly, embodiments of the present disclosure also relate to methods of contact tracing and monitoring room capacities.

Figure 12:
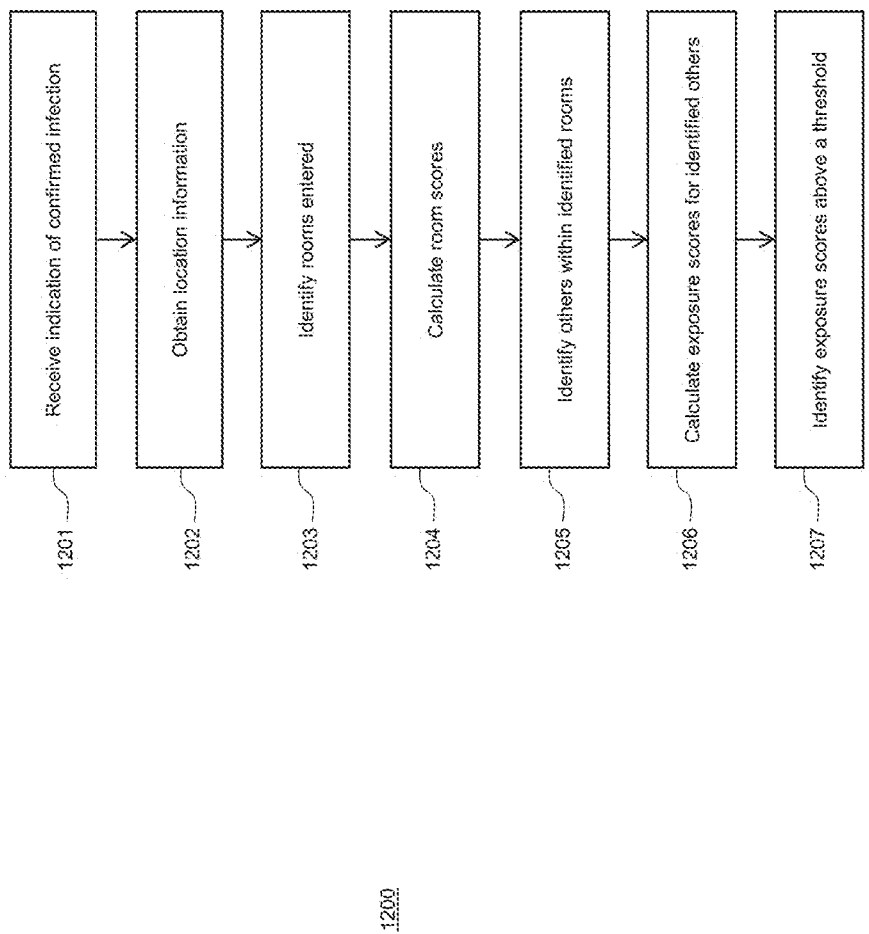
FIG. 12 is an example process for contact tracing, according to some embodiments of the present disclosure.

FIG. 12 is an example process 1200 for contact tracing, according to some embodiments of the present disclosure. Because, as described previously, portable units (e.g. portable units 14 for teachers, portable units 16 for people such as janitors, and portable units 18 for students) are able to determine a location based on other members of the mesh network (e.g. other portable units and stationary units) and periodically broadcast information (e.g. location, time-stamp information, IDs, etc.) to an administrative unit 28, which is stored in a database, there exists sufficient information to track movements of specific portable units. In some embodiments, a person's identity can be associated with a portable unit (e.g. correlating a person's ID number and a portable unit ID number), which can allow for specific portable units to be selected and analyzed to analyze a person's movements. In some embodiments, various steps in process 1200 can be performed by administrative unit 28, an external server or computing device, or in a cloud-computing environment (e.g. Amazon Web Services).

At block 1201, an administrative unit 28 can receive an indication of a confirmed infection. For example, an administrator of a school, hotel, or other similar site protected by the systems of FIGS. 1 and 9 may have been notified that an employee, member, student, guest, or any other person on site that is associated with a portable unit has tested positive for an infectious disease (e.g. COVID-19). Accordingly, an administrator could use administrative unit 28 to input an indication that an individual (e.g. John) was a confirmed infection. At block 1202, a server can obtain location information associated with the confirmed infection. In some embodiments, obtaining location information can include accessing the database in which information broadcast from all portable units within the site are stored. For example, the server can query the database by ID (e.g. the portable unit ID associated with the confirmed infection) and extract location and associated time-stamp information. In some embodiments, all historical information may be obtained, or historical information with a pre-specified time-frame may be obtained. In some embodiments, this time frame may be selected based on the disease of the individual. For example, if John was infected with COVID-19, an administrator may wish to obtain location information for the two weeks prior to confirmation of the infection. At block 1203, the server can identify rooms entered by the confirmed infection. In some embodiments, each room in the protected site (e.g. rooms 24 in system 10 of FIG. 1) may be geofenced and have an associated room ID. For example, the server may identify that the confirmed infection entered three different rooms within the past two weeks of a school, such as a classroom, a bathroom, and a teacher's office.

At block 1204, the server can calculate a room score for each room identified as entered by the confirmed infection. A room score may reflect the level of exposure of the room to the infectious disease and may reflect the likelihood that an additional person in the room also contracts the disease. For example, a higher score can indicate that a room has had more exposure to the disease than a room with a lower score. In some embodiments, an infected individual can be assigned a standard score by the server (e.g. 10, 100, etc.), which sometimes can be used as a relative maximum for score calculations within the system, although this may only be used as a maximum for room scores. In some embodiments, for every period of time an infected individual is detected as being within a room, the room may receive a percentage of the individual's score for each period of time. For example, for every ten minutes John is identified as being in a classroom, the room can receive ten percent of John's score. In the example that a confirmed case is given a score of ten, a classroom would be given a score of two if John were detected as being in the classroom for twenty minutes. Note, the duration and percentage used for scoring may vary and ten percent for ten minutes is merely exemplary in nature and may vary based on the disease at hand. In some embodiments, a room score may be calculated for each room the confirmed infection has been identified as entering in the past two weeks, and the score may be associated with the room ID of each room.

In some embodiments, the room score may be reduced to reflect decreases in exposure due to the infected individual leaving the room. In some embodiments, the room score may be reduced by a percentage for every period of time the infected individual is not in the room. In some embodiments, the room score may be decreased by ten percent for every ten minutes the infected individual is not in the room. For example, if John enters a room at 2:00 pm and stays there for a hundred minutes (e.g. an hour and forty minutes), at 3:40 pm the room can have a score of ten points. Assuming John leaves the room at 3:40 pm, the room can then have a score of nine at 3:50 pm, a score of 8.1 at 4:00 pm, and 7.3 at 4:10 pm. Note, these values are exemplary and other values and percentages could be used according to specific diseases or various other factors. Additionally, this method of calculating room scores allows for time-dependent plots of room scores over the course of the two-week period, which can be correlated and used for analysis with other time-dependent plots associated with specific individuals (e.g. movement, temperature plots, etc.).

At block 1205, the server can identify others within the identified rooms. For example, as each portable unit can periodically broadcast location information, the server can access each portable unit within the protected site historical movements from the specified period (e.g. two-week period for a COVID-19 application) and determine if the unit entered each room identified in block 1203. At block 1206, the server can calculate exposure scores for each individual identified as having entered one of the rooms with room scores calculated for. In some embodiments, an exposure score for an individual (e.g. David) can reflect exposure both from being in an identified room at the same time as the confirmed infection and from being in an identified room not at the same time as the confirmed infection (e.g. can be proportional to the time spent). For example, if David is simultaneously in the same room as John, David's exposure score can increase by ten percent of the sum of the room score and John's score every ten minutes. If David is in a room John has previously entered but is not in anymore, David's score can increase by ten percent of the room score. In some embodiments, an exposure score for an individual can be a cumulative score over a period of time. For example, if David has been detected as entering three rooms during the period in question, David's exposure score would be a cumulative score reflecting the level of exposure/risk of infection from all three rooms. In some embodiments, the exposure score may also have a maximum, which can be the same as the maximum room score. Note, similar to as described before in relation to room score calculations, the numbers and percentages are exemplary and may change to reflect various diseases or desired scoring principles. At block 1207, the server can analyze the exposure scores for all portable units within the site and identify the exposure scores that exceed a certain pre-defined threshold. In some embodiments, a threshold may depend on various factors, such as the actual infectious disease, and may reflect a likelihood and/or probability that the individual for which the score has been calculated has contracted the disease. Utilizing a threshold value can indicate which individuals have the most realistic chance of having contracted the disease. A benefit of this approach is that, after an individual that has interacted in a public setting has been confirmed as being infected with a contagious disease, the most likely candidates for which the disease was spread to can be found, and further procedures can be taken with these identified individuals, such as testing, quarantine, and/or treatment.

Note, while a server was used in the previous description to describe process 1200 in a detail, other similar structures could also be used, such as a cloud-computing platform. In some embodiments, the information stored and analyzed in a cloud-computing platform can be anonymized to protect the identities of individuals within the site from being accessed in the case of a hack.

Figure 13:
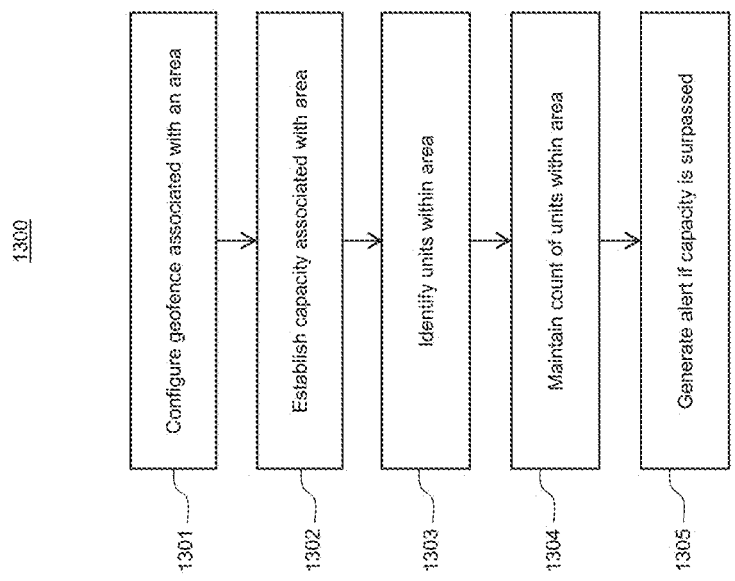
FIG. 13 is an example process for monitoring room capacities, according to some embodiments of the present disclosure.

FIG. 13 is an example process 1300 for monitoring room capacities, according to some embodiments of the present disclosure. As alluded to in the description of FIG. 12 and as is the case when dealing with the spread of infectious disease, limiting physical contact and proximity of contact between people can be important in preventing the spread of an infectious disease. This can often be managed by enforcing capacity restrictions, such as at a bar or other location. However, within the location, it can be difficult to enforce capacity restrictions on a smaller scale in which a location or site has multiple rooms. Accordingly, embodiments of the present disclosure can relate to managing capacities on a room scale. In some embodiments, as mentioned earlier, this can be used to treat and manage the spread of infectious diseases. However, in some embodiments, the methods described herein can be used to enforce room capacities for use in many other applications. The mesh network and system as described herein in relation to FIGS. 1 and 9 can provide the tools for such an enforcement and management protocol.

At block 1301, an administrative unit (e.g. administrative unit 28) can configure a geofence associated with an area. In some embodiments, an area may be a room (e.g. room 24 of system 10 in FIG. 1), for example a classroom, a hotel room, a conference room, etc. within a protected site. Geofencing can include virtual perimeters for a real-world geographic area; in other words, the system 10 can define virtual perimeters for each room in the protected site. This can allow for each room to be looked at separately, and each room can have an associated room ID for analysis purposes and tracking purposes.

At block 1302, an administrator (e.g. via administrative unit 28) can establish a capacity associated with a specific area. For example, the administrator may want to set a capacity on a conference room to ten people. The conference room, by room ID, can then have a capacity limit defined as ten people within the system managed by administrative unit 28. At block 1303, administrative unit 28 can identify portable units within the area (e.g. the conference room). As described previously, portable units (e.g. portable units 14, 16, and 18) can be configured to periodically broadcast their location and other information to administrative unit 28. Based on the pre-defined geofence of the area, the administrative unit 28 can identify portable units that are located within the area. At block 1304, the administrative unit 28 can maintain a count of portable units that are currently within the pre-defined area. For example, if there are six portable units that have most recently broadcast their information and location to the administrative unit (and the location is within the boundaries of the area), then the administrative unit 28 can maintain a current count of six for the area. In some embodiments, the administrative unit 28 can update the count as portable units continue to broadcast their location and increase or decrease the count to reflect the continued updates. At block 1305, if the count exceeds the capacity defined in block 1302, then the system can generate an alert which can be displayed on administrative unit 28. This can notify an administrator managing the administrative unit 28 that rooms have exceed capacity and inform them of which room it is.

Figure 14:
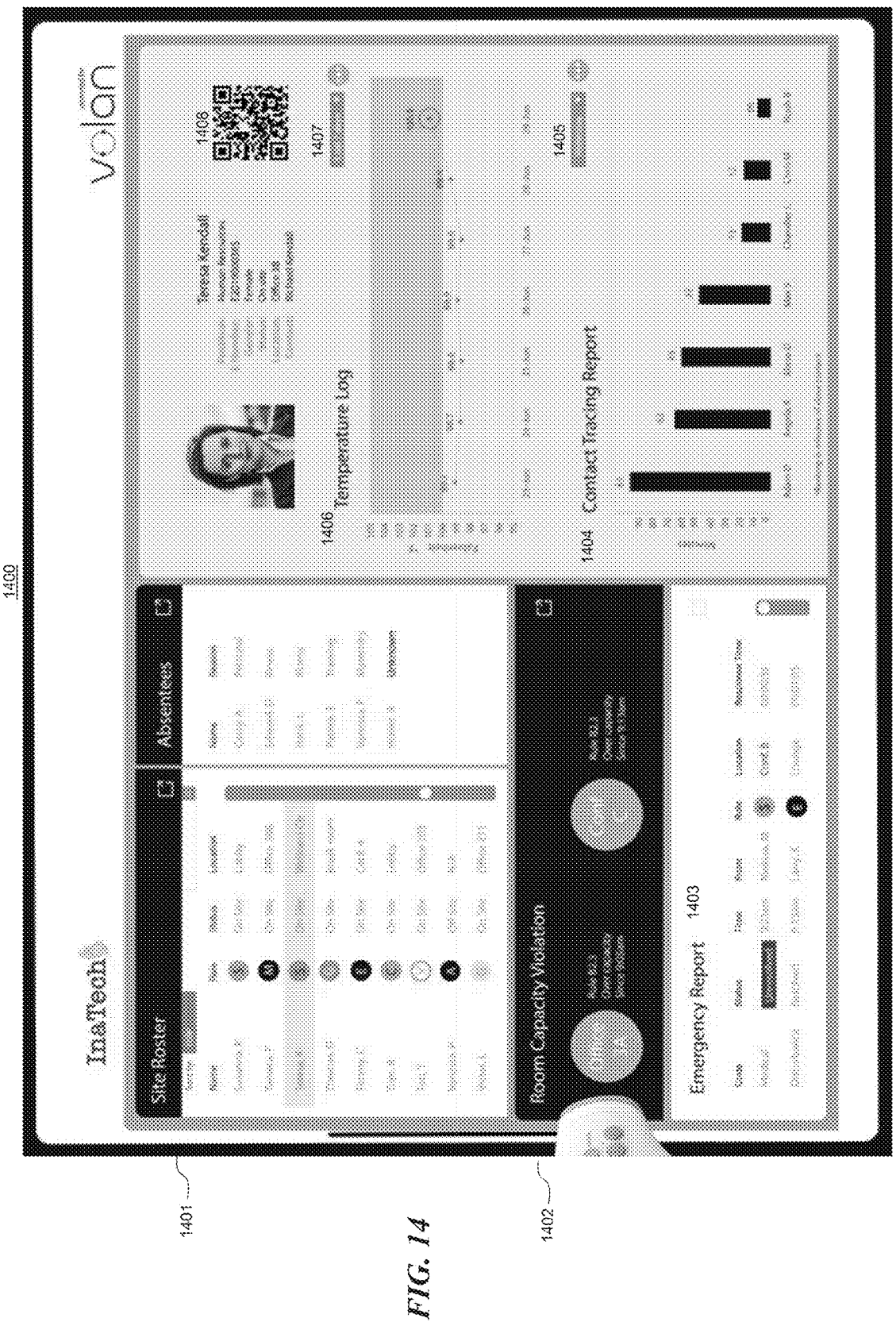
FIG. 14 is an example user interface, according to some embodiments of the present disclosure.

FIG. 14 is an example user interface 1400, according to some embodiments of the present disclosure. In some embodiments, interface 1400 can be displayed to an administrator or other user on administrative unit 28. Interface 1400 can be referred to as a dashboard and can help an administrator manage an organization within a protected site, such as a site as protected by system 10 in FIG. 1. In some embodiments, interface 1400 can include a site roster 1401, where the roster can include a list of all individuals that are tracked within the site. Each individual can have a defined home location and a status (e.g. on-site or off-site) and can be associated with a portable unit. Note, the type of portable unit can depend on the individual's role within the organization. In some embodiments, interface 1400 can include a list of room capacity violations 1402. Room capacity violations can be determined via process 1300 in FIG. 13. Each room capacity violation listed can include the name of the room and the time since the capacity was violated.

In some embodiments, interface 1400 can include an emergency report 1403. The emergency report 1403 can include a list of incidents (e.g. incidents as defined by process 1000 in FIG. 10) and various information associated with each incident, such as the status, time, and person it originated from. In some embodiments, interface 1400 can include a contact tracing report 1404 for a specific person selected from the site roster 1401 (e.g. Teresa Kendall as shown). Contact tracing report 1404 can include a list of people that the selected person came into contact with and the duration of the contact. In some embodiments, the contact tracing report 1404 can include a drop-down menu 1405 which can allow a user/administrator to select a desired time period for which to view contact statistics. In some embodiments, interface 1400 can include a temperate log 1406. A temperature log 1406 for a selected person can plot the selected person's temperature as a function of time (e.g. day by day). In some embodiments, the temperature can be received and stored by use of a QR code (e.g. QR code 1408). For example, assuming Teresa Kendall is a teacher at a school and has a portable unit 14 associated with her, her assigned portable unit 14 can include a QR code and is associated with her profile that is accessible by administrative unit 28. A thermometer can be used to take her temperature, and a QR code can be used to store the temperature with the profile. In some embodiments, this can allow for a person's temperature to be tracked over time, which can allow for more insight when performing contact tracing (e.g. as described in relation to process 1200). In some embodiments, temperature log 1406 can include a drop-down menu 1407, in which a user/administrator can use to change the viewable time frame.

In the foregoing specification, specific embodiments have been described. However, one of ordinary skill in the art appreciates that various modifications and changes can be made without departing from the scope of the claims below. For example, although the present disclosure has been described and illustrated in connection with a school, it is not intended to be so limited. In the case of an office, the portable units 14, 16 could be associated with office managers, and the portable units 18 could be associated with employees. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A method for managing a capacity of an area comprising:
    configuring a geofence within a mesh network that defines an area within a site;
    establishing a capacity associated with the area;
    analyzing a location of a plurality of portable units worn or carried by a plurality of selected users within the mesh network;
    identifying a number of portable units located within the area;
    maintaining a current count of the number of portable units located within the area; and
    in response to the current count surpassing the capacity, generating an alert to an administrative unit, wherein the administrative unit is part of the mesh network.

2. The method of claim 1, wherein the mesh network comprises a plurality of stationary units, wherein each of the plurality of portable units, each of the plurality of stationary units, and the administrative unit is in wireless communication with all other units in the mesh network and is configured to receive all signals.

3. The method of claim 2, wherein each of the plurality of portable units, each of the plurality of stationary units, and the administrative unit is configured to interact with all other units in the mesh network.

4. The method of claim 2, wherein the location of a portable unit is determined by analyzing a plurality received signal strength indicators (RSSI) from the plurality of stationary units.

5. The method of claim 1, wherein at least a portion of the plurality of portable units are configured to, while stationary, broadcast information to the administrative unit at a first pre-defined frequency.

6. The method of claim 5, wherein the at least one of the plurality of portable units are configured to, when moving, broadcast information to the administrative unit at a frequency higher than the first frequency.

7. The method of claim 5, wherein the information comprises at least one of:
    an ID associated with a portable unit;
    a location associated with the portable unit;
    a name associated with the portable unit; or
    a role associated with the portable unit.

8. The method of claim 1, wherein at least one of the plurality of portable units comprises a plurality of buttons for sending a signal to the administrative unit for a specific type of emergency.

9. The method of claim 8, a subset of the plurality of portable units are configured to, in response to a button being pressed on the at least one of the plurality of portable units, illuminate an LED associated with the emergency until a deactivation signal has been received from the administrative unit.

* * * * *